United States Patent

Larkin

[11] 4,294,560
[45] Oct. 13, 1981

[54] LOCKING MEANS

[76] Inventor: Miles K. Larkin, 13 Roadley Ave., Pakuranga, Auckland, New Zealand

[21] Appl. No.: 129,665

[22] Filed: Mar. 12, 1980

[51] Int. Cl.³ .............................................. F16B 7/10
[52] U.S. Cl. .................................... 403/104; 403/351; 248/411
[58] Field of Search ............................ 403/104, 351; 248/188.5, 411, 412, 414

[56] References Cited

U.S. PATENT DOCUMENTS

| | | | |
|---|---|---|---|
| 2,367,196 | 11/1945 | Butler | 403/104 |
| 2,473,351 | 6/1949 | Thompson et al. | 248/188.5 |
| 2,503,997 | 4/1950 | Bu Miller | 248/188.5 |
| 2,542,967 | 2/1951 | Waechter | 248/188.5 |
| 2,873,129 | 2/1959 | Edmundson | 248/188.5 X |
| 3,004,743 | 10/1961 | Wenger | 248/414 UX |
| 3,515,418 | 6/1970 | Nielsen, Jr. | 248/188.5 X |
| 3,674,294 | 7/1972 | Kirkham | 403/104 |

FOREIGN PATENT DOCUMENTS

| | | | |
|---|---|---|---|
| 530320 | 7/1931 | Fed. Rep. of Germany | 248/188.5 |
| 1040113 | 5/1953 | France | 248/188.5 |

*Primary Examiner*—Andrew V. Kundrat
*Attorney, Agent, or Firm*—Holman & Stern

[57] ABSTRACT

The invention relates to locking means for telescopically adjustable tubes and includes a support which is mountable in an inner tube. A stem is connected to or is integral with the support and a resilient bushing member is provided on the stem. In addition, a locking member is mounted on the stem which is capable of engaging with an outer tube but that on operation of the invention the adjustable tubes are locked relative to one another.

8 Claims, 6 Drawing Figures

LOCKING MEANS

BRIEF SUMMARY OF THE INVENTION

This invention relates to locking means suitable for use with telescopic tubes, for example tent poles, tripod legs and the like. With such telescopic tubes, it is desirable to adjust the tubes relative to one another and to lock them in different positions to vary the locked length of the overall combination.

Twist locks have been proposed consisting of an eccentrically mounted sleeve which when rotated will cause friction locking between the tubes. Such twist locks are commonly found in the legs of camera tripods. However, they have a tendency to slip under load. Another proposal involves the use of an expanding rubber bung having a screw threaded component which when rotated causes the bung to be axially compressed and thus to expand radially causing the bung to be frictionally locked to the outer tube in the manner of an expandible rubber bung for bottles. However, this type of locking means requires the bung to be a tight fit within the outer tube even in its unexpanded state to enable the bung to be held by the outer tube whilst the other tube is twisted to operate the screw threaded mechanism. Naturally, this requires the bung to be a very tight fit and thus makes it very difficult to slide the tubes relative to one another.

There is thus a need for a locking mechanism which enables telescopic tubes to be readily adjusted and which when locked will tend to hold the tubes securely relative to one another.

It is an object of this invention to provide an improved locking means which will meet the abovementioned need.

In one aspect, the invention provides a locking means for telescopically adjustable tubes including: a support mountable in an inner tube, a stem connected to or integral with said support, a resilient bushing on said stem, and a locking member mounted on said stem capable of engaging with an outer tube.

This enables the support to be attached to an inner tube, and an outer tube to be readily slid over the locking member and said inner tube, and yet enable the tubes to be locked together to resist axial loads.

BRIEF DESCRIPTION OF THE SEVERAL VIEWS OF THE DRAWING

Other aspects of this invention, which should be considered in all its novel aspects, will become apparent from the following description, which is given by way of example only, with reference to the accompanying drawings, in which.

DETAILED DESCRIPTION

Figure 1:
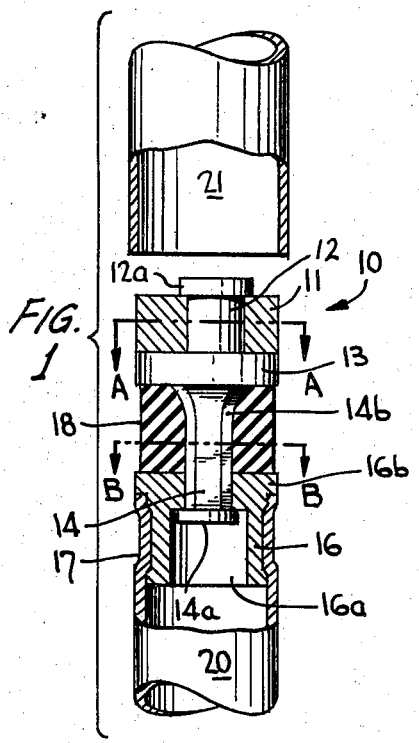
FIG. 1 illustrates an axial section through a first embodiment of the locking means of this invention.

A first embodiment of this invention as shown in FIG. 1 consists of a locking means 10 having a primary locking member 11 eccentrically mounted on eccentric stud 12. Conveniently, the primary locking member is in the form of a cylindrical body having an off-centre bore therethrough. This locking member may be formed of any suitable material, although it is convenient to mould it from a plastics material such as nylon.

The eccentric stud 12 is connected to a cylindrical flange 13 which in turn is connected to a non-rotatable stem 14. Conveniently, the stem 14 is of hexagonal cross-section as shown. The stud, flange and stem may be formed in one piece, e.g. moulded from a plastics material.

The stem 14 is mounted within a support 16 passing through a corresponding hexagonal aperture in the support.

Conveniently, the support is formed from a hollow sleeve having a cavity 16a and an end flange 16b.

Stem 14 is provided with a retaining flange 14a to prevent it being withdrawn from the support 16. Similarly, eccentric stud 12 is provided with retaining flange 12a to retain the primary locking member on the stud.

The support 16 is mounted on an inner tube 20 at one end thereof, in such a manner that the support 16 cannot rotate with respect to said inner tube 20. This is conveniently, achieved by keying the support to the tube, for example by forming dimples or depressions 17 in the side of the tube to engage with complimentary recesses in the side of the support 16.

Interposed between flange 13 and the end flange 16b of the support, is a resilient member 18, consisting of a rubber bushing having a central aperture therethrough corresponding to the cross-section of stem 14.

Locking member 11, flange 13, and end flange 16b are conveniently formed of substantially the same diameter as the inner tube 20. On the other hand, it is preferred that the resilient member 18 has a diameter slightly less than that of flange 13 or end flange 16b, so that in its unstressed state (i.e. as shown), it will not contact the inside of outer tube 21.

The stem 14 is provided with a splayed shoulder 14b adjacent flange 13, and the resilient portion 18 has a corresponding bore so that the bore adjacent flange 13 is enlarged to compliment the shoulder 14b.

In use, with the locking means connected to the inner tube 20, the outer tube 21 can be slid over the locking means and the inner tube to a desired position. The inner tube and outer tubes can be rotated relative to one another, thereby causing the primary locking member 11 to rotate with respect to eccentric stud 12 and thus move into frictional locking engagement with outer tube 21. It will be noted that stud 12 being connected to the support 16 by means of the non-rotatable stem 14, will be prevented from rotation thereby allowing the locking member 11 to move into engagement with the outer tube 21. In the event of the outer tube tending to move axially downwards with respect to the inner tube, for example in the direction of arrows A and B, this will cause the locking member 11 to move downwards thereby forcing stem 14 to slide within the aperture in the support 16. This downwards movement of the locking member, flange 13 and stem 14 will cause the resilient bushing 18 to be axially compressed between flange 13 and flange 16b. In so doing, the upper portion of the resileint bushing will be caused to splay outwardly as it is engaged by shoulder 14b and further axial compression will cause the remainder of the bushing to expand radially into contact with the inner wall of the outer tube 21, thereby increasing the frictional locking between the locking means and the outer tube 21. The resilient bushing thereby provides additional locking means when an axially compressive load is applied to the locking member.

When the load is removed, the resilient bushing relaxes, and the tubes can be disengaged by rotating the tubes with respect to one another, so that the locking member moves into the position shown in FIG. 1 allowing the outer tube to slide over the locking member and the inner tube. It will be noted that the reduced diameter of the resilient bushing enables the outer tube to slide over the locking member without frictionally engaging the bushing.

Figure 4:
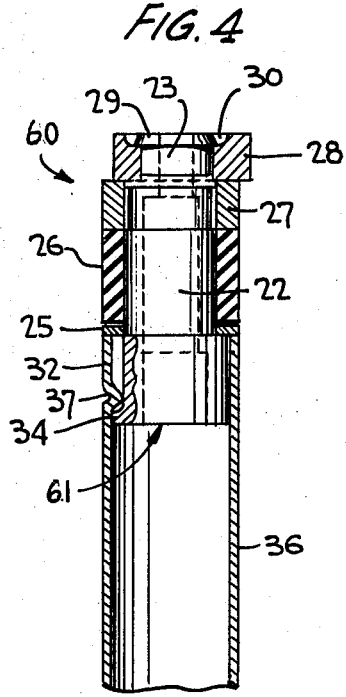
FIG. 4 illustrates a second embodiment of the locking means of this invention.

Turning now to FIG. 4 there is illustrated a second embodiment of the invention. This is locking means 60. It has a support 61 having a stem 22 integral therewith. An eccentric stud 23 is provided integral with the upper end of the stem 22, being offset from the main axis thereof.

A washer 25 is provided on the stem 22 adjacent the support 61. A resilient bushing 26 is provided on the stem 22, with a spacer 27 on top of the resilient bushing. An eccentric locking member 28 is also provided on the eccentric stud 23. It can be attached thereto by deforming the head 29 of the stud 23. If desired, a suitably enlarged recess 30 may be provided in the head of the eccentric member to accommodate the enlarged head of the eccentic stud 23.

The support 61 is provided with a groove or channel 32 extending part of the length of the support member 61. Conveniently, it stops short of the end of the support member thus there is a stop 34 at the lower end of the support member. When the locking means is attached to an inner tube 36, the tube can be provided with one or more detents 37 extending into the groove 32. This could be achieved by punching the outer surface of the tube. By this means, the support 61 and its associated stem can slide downwardly into the inner tube 36, but will be prevented from rotating with respect to tube 36.

In use, an outer tube can be slid over the locking means and the inner tube. The two tubes can be locked together by rotating the outer tube with respect to the inner tube. This will cause the eccentric locking member 28 to rotate and engage with the inside of the outer tube. An axially compressive load applied to the tubes will cause the locking member, spacer, stem and support to move downwardly within the inner tube 36. This will cause the resilient bushing 26 to be axially compressed between the spacer 27 and the washer 25. This axial compression of the resilient member will cause it to bulge outwardly providing tight frictional engagement between the resilient bushing and the inside of the outer tube thereby providing an additional locking effect.

Figure 5:
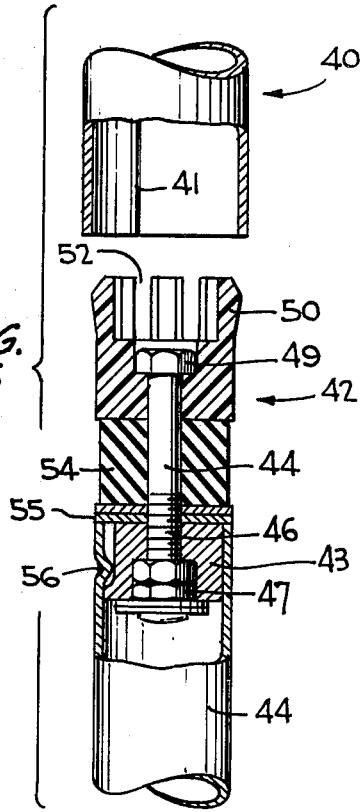
FIG. 5 illustrates a third embodiment of the locking means of this invention.
Figure 2:
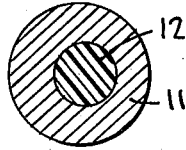
FIG. 2 illustrates a radial cross-section on line A—A of FIG. 1 through the primary locking member.
Figure 3:
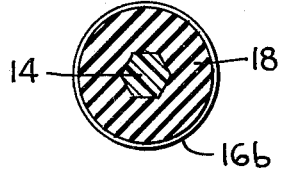
FIG. 3 illustrates a radial cross-section on line B—B of FIG. 1, through the resilient member.
Figure 6:
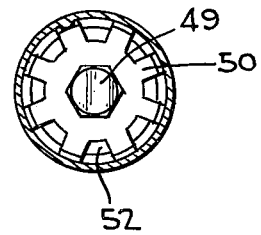
FIG. 6 illustrates an end elevation of the locking means of FIG. 5.

Turning now to FIGS. 5 and 6, there is illustrated a third embodiment of this invention. This embodiment is designed for use with an outer tube 40 having an internal seam or bead 41. Such tubes are conveniently formed of steel. The locking member 42 has a support 43 non-rotatably attached to an inner tube 44. A stem 44 passes through an aperture in said support. The stem is provided with a threaded portion 46 engaging with a corresponding thread in the support 43. Such a thread on this support may be formed by a securing nut 47 attached to the support 43. The other end of the stem 44 is preferably provided with a head 49 non-rotatably attached to a primary locking member 50. This primary locking member 50 has one or more grooves or channels 52 on the outer surface thereof capable of engaging with the seam or bead 41 of the outer tube. It is preferably formed of a semi-rigid material (e.g. nylon, P.V.C., or spring steel) so as to be in light frictional contact with the tube wall, allowing for slight variations in tube diameter.

A resilient bushing 54 is provided on the stem between the primary locking member and one or more washers 55 adjacent the support 43.

The support 43 may be keyed to the inner tube 44 by means of a detent 56 to prevent this support from rotating or moving axially with respect to the inner tube.

It will be appreciated that the resilient bushing 54 can be of lesser external diameter than the internal diameter of tube 40. This will enable the outer tube to readily slide over the locking means and the inner tube. When it is desired to lock the two tubes together the tubes can be rotated with respect to one another. As the locking member 50 will be non-rotatably engaged with the inner seam 41 of the outer tube 40, it will be appreciated that rotation of the outer tube with respect to the inner tube will cause the locking member 50 and hence the stem 44 to rotate with respect to the support 43. Depending upon the direction of rotation, the locking member 50 will move towards or away from this support 43. If the locking member 50 moves towards support 43, then the resilient bushing will be axially compressed, thereby causing it to bulge outwardly and to frictionally engage the inside of the outer tube 40.

The embodiments illustrated in the drawings have been designed for use with a telescopic tent pole, where the primary load will be an axially compressive load on the locking member. However, it will be appreciated that various embodiments can be constructed to allow the locking member to resist sliding movement of the poles away from one another, as well as sliding movement of the poles towards one another as has been described above.

For example, in an alternative embodiment, the locking means could consist of a support member for attachment to the end of the tube having an upstanding eccentrically mounted fixed stud on which is positioned first resilient bushing, eccentric locking member, and a second resilient bushing, and retained by an enlarged retaining flange.

In such an arrangement the two resilient sleeves can be provided with off centre bores as well as the locking members. The locking member and the flange are preferably of diameter equivalent to the diameter of the inner tube, whilst the pair of resilient sleeves are preferably of slightly lesser diameter as has been described with reference to FIG. 1. The flange itself would be secured to the end of the stud whilst the locking member will be capable of axial movement with respect to the support and thus could be sidably mounted on the stud.

In use, the tubes could be locked by rotation of the tubes with respect to one another thereby causing the locking member to move in frictional engagement with the outer tube. Any tendency for the tubes to slide with respect to one another would cause one or other of the resilient sleeves to be axially compressed. For example, movement of the tubes towards one another would cause the lowermost resilient sleeve to be axially compressed between the slidably mounted locking member and the end face of the support, in a similar fashion to the axial compression of resilient bushing 18 in FIG. 1. In the event of the tubes being pulled apart from one another, then the uppermost resilient sleeve would be compressed between the slidable locking member and the upper flange. In either event, the axial compression of the resilient sleeves would cause the sleeves to expand radially and thereby frictionally engage the outer tube to increase the locking effect.

Finally, it will be appreciated that various other alterations or modifications may be made to the foregoing without departing from the scope of this invention as exemplified in the following claims.

I claim:

1. Locking means for inner and outer telescopically engageable tubes, including at least one primary locking member and at least one secondary locking member in the form of a substantially resilient bushing mounted within a section of the inner tube which is within the outer tube, so as to be engageable with the inner surface of the outer tube, the primary locking member and resilient bushing being mounted relative to the inner tube and to each other so that relative rotational movement between said inner and outer tubes causes said primary locking member to lockingly engage the inner surface of said outer tube and a further relative axial movement between said inner and outer tubes causes said resilient bushing to be compressed longitudinally and thereby to expand substantially radially into engagement with the inner surface of said outer tube.

2. Locking means as claimed in claim 1, and further comprising a support mountable within said inner tube and a stem connected to said support, said resilient bushing and primary locking member being mounted on said stem.

3. Locking means as claimed in claim 2, wherein said primary locking member is eccentrically mounted on said stem.

4. Locking means as claimed in claim 3, wherein a spacer is provided between said primary locking member and said resilient bushing.

5. Locking means as claimed in claim 4, wherein said support is provided with a channel in an outer face thereof to enable said support to move axially within said inner tube.

6. Locking means for inner and outer telescopically adjustable tubes comprising a support mountable within the inner tube, a stem connected to said support, a resilient bushing on said stem, a locking member eccentrically mounted on said stem capable of engaging with the outer tube, a spacer between said locking member and said resilient bushing, and a channel in the outer face of said support to enable said support to move axially within said inner tube.

7. Locking means as claimed in claim 5 or claim 6, attached to said inner tube by one or more internal projections extending into said channel to thereby prevent the support from rotating with respect to said inner tube.

8. The locking means as claimed in claim 7, wherein a washer is provided between said inner tube and said resilient bushing.

* * * * *